July 3, 1962   J. A. DAVIS   3,042,424
AUTOMOTIVE AXLE SUSPENSION CONSTRUCTION
Filed April 1, 1960
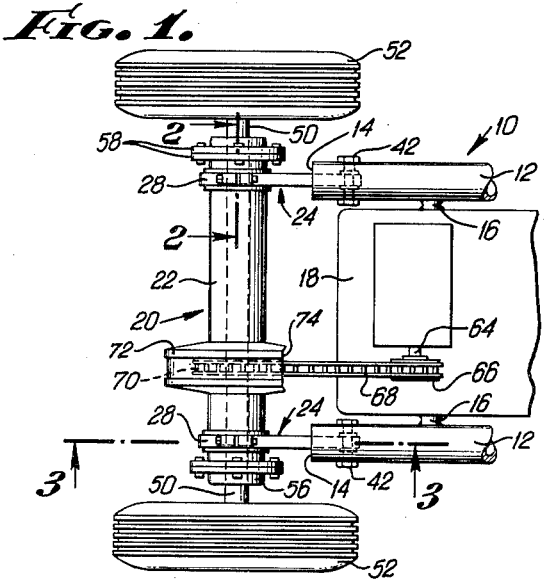
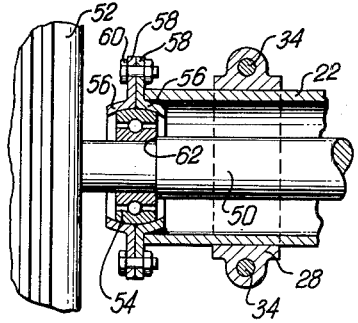
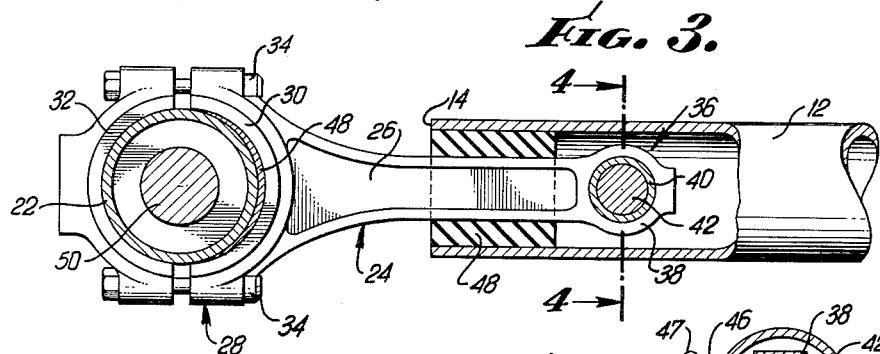
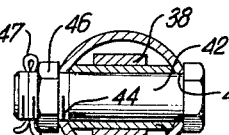
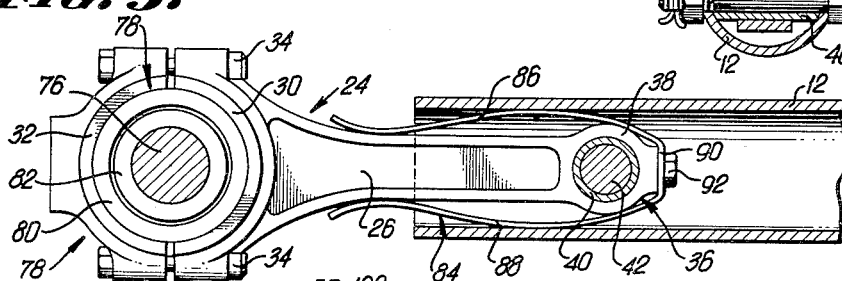
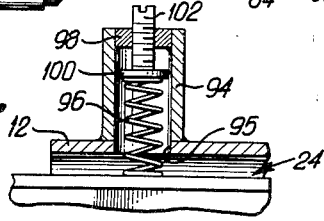
INVENTOR.
JAMES A. DAVIS
BY
Huebner & Worrel
ATTORNEYS.

United States Patent Office 3,042,424
Patented July 3, 1962

3,042,424
AUTOMOTIVE AXLE SUSPENSION
CONSTRUCTION
James A. Davis, 1854 Hanscom Drive,
South Pasadena, Calif.
Filed Apr. 1, 1960, Ser. No. 19,284
4 Claims. (Cl. 280—106.5)

The present invention relates to vehicle axle suspension systems, and it relates particularly to a novel axle suspension wherein an axle unit is connected to a vehicle frame by means of a plurality of connecting rods, preferably of the type employed in internal combustion engines.

In many kinds of vehicles it is desirable to employ an axle mounting or suspension system which permits quick removal and replacement of the axle for changing the gear ratio or in case of axle damage, which permits the positioning of the axle to be readily adjusted, and which provides independent springing at both ends of the axle, yet which is simple, inexpensive and sturdy. Examples of some vehicles in which an axle suspension system of this character is desirable are small "go-carts," "quarter midget" racers, golf carts, small passenger automobiles similar to some of the small foreign cars, and others. However, it is to be understood that the axle suspension system of the present invention is not limited to use on any particular type of vehicle, and that the foregoing vehicles are given by way of example only.

It is accordingly an object of the present invention to provide a novel axle suspension system wherein an axle unit is connected to a vehicle frame by means of one or more, preferably two, connecting rods, preferably of the type employed in internal combustion engines.

Another object of the present invention is to provide a vehicle axle suspension system of the character described in which an axle unit is clamped within the relatively large crank bearing end portion of a connecting rod of the type employed in internal combustion engines, the elongate rod portion of the connecting rod extending into an open end of a tubular frame member of the vehicle, the wrist end portion of the connecting rod being pivotally supported within the tubular frame member, with resilient spring means engaged between the connecting rod and the inner wall of the tubular frame member.

Further objects and advantages of this invention will appear during the course of the following part of the specification wherein the details of construction and mode of operation of a preferred embodiment are described with reference to the accompanying drawing, in which:

FIG. 1 is a top plan view illustrating the present invention as employed for mounting the rear axle unit of a "go-cart."

FIG. 2 is an enlarged vertical section along the line 2—2 in FIG. 1.

FIG. 3 is an enlarged vertical section along the line 3—3 in FIG. 1.

FIG. 4 is a vertical section along the line 4—4 in FIG. 3.

FIG. 5 is a vertical section similar to FIG. 3 but illustrating an alternative embodiment of the invention.

FIG. 6 is a vertical sectional view illustrating further spring means which may be employed in my invention.

Referring to the drawings, and at first particularly to FIGS. 1–4 thereof, the invention has been illustrated as applied to the rear portion of a vehicle 10 of the "go-cart" type. This type of vehicle is currently enjoying extensive use in the United States for both amusement and racing.

The vehicle chassis includes a pair of spaced, longitudinally arranged tubular frame members 12 having open rear ends 14. The longitudinal frame members 12 are connected by a tubular frame cross member 16 upon which a small gasoline engine 18 is mounted. The engine 18 is diagrammatically shown in FIG. 1 of the drawing, and may be mounted in any desired manner, and also may comprise any suitable type of engine.

The rear end axle unit 20 shown in FIGS. 1, 2 and 3 of the drawing includes an axle support tube 22 which is supported to the rear of the longitudinally arranged tubular frame members 12 by means of a pair of connecting rods 24 of the type employed in internal combustion engines. Each of the connecting rods 24 is supported within a respective tubular frame member 12, the elongate rod portion 26 of each connecting rod 24 extending rearwardly of the open rear end 14 of the respective tubular frame member 12, with the enlarged crank bearing end portion 28 of each connecting rod 24 being positioned substantially to the rear of the respective frame member rear end 14. The enlarged crank bearing end portion 28 of each connecting rod 24 includes fixed semi-cyclindrical portion 30 forming an integral extension of the elongate rod portion 26, and a semi-cyclindrical clamp portion 32 which is attached to the fixed semi-cylindrical portion 30 by means of a pair of bolts 34. The axle support tube 22 is tightly gripped within the crank bearing end portions 28 of the connecting rods 24 adjacent the respective ends of axle support tube 22.

As best shown in FIGS. 3 and 4, the wrist end portion 36 of each connecting rod 24 is disposed inside of the respective tubular frame member 12 substantially inwardly or forwardly of the open rear end 14 of the tubular frame member. The wrist end portion 36 of each connecting rod 24 is formed in a transverse sleeve 38 which receives tubular wrist pin 40 therethrough. The wrist pin 40 is cut to a length substantially equal to the inside diameter of the respective tubular frame member 12, and may be curved at the ends of wrist pin 40 as shown in FIG. 4 to the contour of the inner wall of the tubular frame member, if desired.

A bolt 42 extends through diametrically opposed holes 44 through the wall of the respective frame member 12, and through the tubular wrist pin 40. Nut 46 is applied to the threaded shank of bolt 42 on the opposite side of frame member 12 from the bolt head, and nut 46 may be locked in position by means of a cotter pin 47 or by other suitable means. The nut 46 may be tightened to an extent which will securely clamp the opposite sides of the tubular frame member 12 against the ends of wrist pin 40 so as to securely hold wrist pin 40 in fixed position within the frame member 12.

In order to provide for independent springing movement of each end of the axle support tube 22 relative to its respective tubular frame member 12, I provide a sleeve 48 of resilient material, preferably rubber or other suitable elastomer material, around the elongate rod portion 26 of each connecting rod 24 within the respective tubular frame member 12, as best shown in FIG. 3. The resilient sleeve 48 not only provides excellent spring action in a vertical plane, but also permits a slight amount of lateral give to improve turning freedom in the suspension system.

It is to be noted that in my new suspension system, if the spring means 48 should break or deteriorate, the secure connection of the rear end axle unit 20 to the tubular frame members 12 through connecting rods 24 will not in any way be impaired, and that the axle unit 20 will nevertheless remain operatively positioned relative to the vehicle frame.

Longitudinal adjustment of the axle unit 20 relative to the vehicle frame may be accomplished by providing one or more arcuate shim members 48 between the crank bearing end portions 28 of the connecting rods 24 and the axle support tube 22. It will be noted that the shim member 48 illustrated in FIG. 3 of the drawing is positioned forward of the axle support tube 22, thus shifting the rear end unit 20 slightly rearwardly relative to the vehicle frame, which may be desired for tightening a chain drive connection between the engine and the axle.

The axle 50 supports wheels 52 at its respective ends, axle 50 extending axially through the axle support tube 22, and being supported in tube 22 by means of a plurality of anti-friction bearings 54. One anti-friction bearing 54 is preferably provided at each end of axle support tube 22, and further bearings may be provided in axle support tube 22 intermediate the ends of tube 22, if desired. A presently preferred type of anti-friction bearing 54 is of the self-centering type which is universally pivotally mounted within a pair of abutting bearing support sleeves 56 which curve radially inwardly from their abutting ends, and which have radially outwardly projecting flanges 58 on their abutting ends, the flanges 58 being secured together by means of a plurality of bolts 60 which pass through flanges 58. One of the bearing support sleeves 56 is secured in the end of axle support tube 22 as by welding, while the other axle support sleeve 56 is readily removable by merely disengaging bolts 60 so as to permit the quick removal of the anti-friction bearing 54. The axle 50 is positioned by engagement of an outwardly facing axle shoulder 62 against the bearing 54 at each end of the axle.

The output shaft 64 of engine 18 supports a drive sprocket 66 which drives a chain 68 that extends rearwardly from drive sprocket 66 and is engaged over a driven sprocket 70 integrally mounted on the axle 50. The driven sprocket 70 is preferably enclosed in a housing 72 forming an integral part of the axle support tube 22, housing 72 having a forwardly facing opening 74 for receiving the drive chain 68.

Where the vehicle is of a type which will receive relatively heavy use, with a relatively powerful engine 18, it is preferable to mount an additional pair of anti-friction bearings 54 within the axle support tube 22 at opposite sides of housing 72. Such additional bearings will prevent any whipping of the axle 50 which might otherwise result from the forces applied to axle 50 from drive chain 68 and driven sprocket 70.

Referring now to FIG. 5 of the drawing, the present invention is shown as applied for supporting an exposed axle 76 without utilizing a separate axle support tube such as the tube 22 in FIGS. 1, 2 and 3. The axle 76 is rotatably mounted in a pair of spaced anti-friction bearings 78, with the outer bearing race 80 of each of the bearings 78 being directly clamped within the crank bearing end portion 28 of respective connecting rod 24. The axle 76 is fixedly secured by any conventional means to the inner bearing race 82 of anti-friction bearing 78.

In FIG. 5 of the drawing I have also illustrated alternative spring means which may be employed in my invention in place of the sleeve 48 of resilient material shown in FIG. 3. This alternative spring means of FIG. 5 may, of course, be applied to the embodiment of FIGS. 1, 2 and 3. This alternative spring means comprises a leaf or elliptical spring unit 84 which includes outwardly or rearwardly extending upper and lower leaf spring members 86 and 88, respectively, which are joined together at a yoke portion 90 which is secured to the inner end of connecting rod 24 by means of a bolt 92 or by other suitable means.

Each of the leaf spring members 86 and 88 extends radially outwardly and rearwardly from the yoke portion 90 so as to engage against the inner wall of the tubular frame member 12, and then extends further rearwardly and radially inwardly so as to engage against the elongate rod portion of the connecting rod 24. It will be apparent that the leaf or elliptical spring unit 84 will function similarly as the resilient sleeve type of spring means illustrated in FIG. 3.

Another type of spring means engageable between each connecting rod and its respective tubular frame member 12 is shown in FIG. 6. A tubular housing 94 is integrally attached to each frame member 12, as by welding, so as to extend upwardly therefrom, the inside of housing 94 communicating with the inside of frame member 12 through opening 95 in frame member 12. Coil spring 96 is positioned within housing 94 so as to engage against connecting rod 24, biasing rod 24 downwardly. The upper end of housing 94 is covered by cap 98 which may be threadedly or otherwise connected to housing 94. Spring 96 is adjustably engaged by the head portion 100 of an adjusting screw 102 which extends outwardly through cap 98.

Although I have shown and described in detail my present suspension system as employed for supporting a rear vehicle axle unit, it will be apparent that it is equally adaptable for supporting a front axle unit, if desired.

It will be apparent that my present invention provides an extremely sturdy means for mounting an axle unit, without likelihood of structural failure, with independent springing at the respective ends of the axle unit, while at the same time permitting quick adjustment of the positioning of the axle unit, and permitting one axle unit to be quickly removed and replaced by another axle unit with a minimum of effort. Such quick changing of axle units is often desirable for providing a quick change of gear ratios, which may be accomplished by providing a second axle unit having a different sprocket size. Also, such quick changing of axle units permits worn-out tires to be replaced by new ones by merely quickly replacing one axle unit by another. Tire replacement may be accomplished faster by this means than by individually replacing the tires. Further, in case of damage to one axle unit, it can be quickly and easily replaced by a second, undamaged axle unit.

While the instant invention has been shown and described herein, in what is conceived to be the most practical and preferred embodiment, it is recognized that departures may be made therefrom within the scope of the invention, which is therefore not to be limited to the details disclosed herein, but is to be accorded the full scope of the claims.

Having described my invention, what I claim as new and desire to secure by Letters Patent is:

1. A vehicle axle suspension system which comprises: an axle unit; a unitary vehicle frame, said frame including a tubular frame member having an open end; and a connecting rod, one end of said connecting rod being tightly clamped around said axle unit, the other end of said connecting rod extending into said tubular frame member through its said open end so as to be completely enclosed within said tubular frame member, said other end of said connecting rod being pivotally connected to said tubular frame member at a point remote from the open end thereof; and spring means in engagement with said tubular frame member and said connecting rod intermediate the ends thereof and between the point of pivot of said connecting rod and the one end of said connecting rod clamped around said axle unit.

2. A vehicle axle suspension system as defined in claim 1 wherein said spring means comprises a sleeve of resilient material disposed about said connecting rod and engaged against the inner wall of said tubular frame member.

3. A vehicle axle suspension system as defined in claim 1 wherein said spring means comprises an elongate, metallic spring member engaged against said connecting rod and against the inner wall of said tubular frame member.

4. A vehicle axle suspension system as defined in claim 1 wherein said spring means includes a tubular housing member connected to said tubular frame member and extending upwardly therefrom, said tubular frame member including an opening through the fall which provides communication between the inside of said tubular housing member and the inside of said tubular frame member, and said spring means including a coil spring positioned in said housing and engaged at one end against said connecting rod so as to bias said connecting rod downwardly.

References Cited in the file of this patent

UNITED STATES PATENTS

| | | |
|---|---|---|
| 1,171,941 | Goodwin | Feb. 15, 1916 |
| 2,480,934 | Julien | Sept. 6, 1949 |

FOREIGN PATENTS

| | | |
|---|---|---|
| 448,219 | Italy | May 12, 1949 |
| 776,620 | Great Britain | June 12, 1957 |
| 1,191,684 | France | Oct. 21, 1959 |